United States Patent [19]

McKechnie

[11] 4,179,919

[45] Dec. 25, 1979

[54] TERRAIN CONTOUR TRACKING SYSTEM

[75] Inventor: John C. McKechnie, Maitland, Fla.

[73] Assignee: The United States of America as represented by the Secretary of the Navy, Washington, D.C.

[21] Appl. No.: 943,406

[22] Filed: Sep. 18, 1978

[51] Int. Cl.² ............................................. G01B 13/08
[52] U.S. Cl. ........................................ 73/37.5; 73/105
[58] Field of Search ................ 73/37.5, 104, 105, 159, 73/37, 37.6, 37.7

[56] References Cited

U.S. PATENT DOCUMENTS 3,470,739  10/1969  Takafuji et al. ......................... 73/159

FOREIGN PATENT DOCUMENTS 504525  2/1976  U.S.S.R. ..................................... 73/105

Primary Examiner—Jerry W. Myracle

Attorney, Agent, or Firm—Richard S. Sciascia; Robert W. Adams

[57] ABSTRACT

An analog surface profile follower and indicator system is disclosed which pneumatically senses and follows the gradients occurring in the surface of either the earth's terrain or a modelboard by means of a pneumatic probe and negative feedback control sub-system which maintains said pneumatic probe at a predetermined distance from the terrain or modelboard surface being sensed at any given instant, as the entire profile follower system is moved in such manner as to effect a desired traverse thereof by any suitable carrier vehicle. A probe position pick-off is effectively connected to the aforesaid negative feedback control subsystem and supplies an analog signal to an appropriate readout which, in turn, indicates the position of said pneumatic probe with respect to a predetermined datum, thereby effectively indicating the surface irregularities of the aforesaid terrain or modelboard.

23 Claims, 3 Drawing Figures

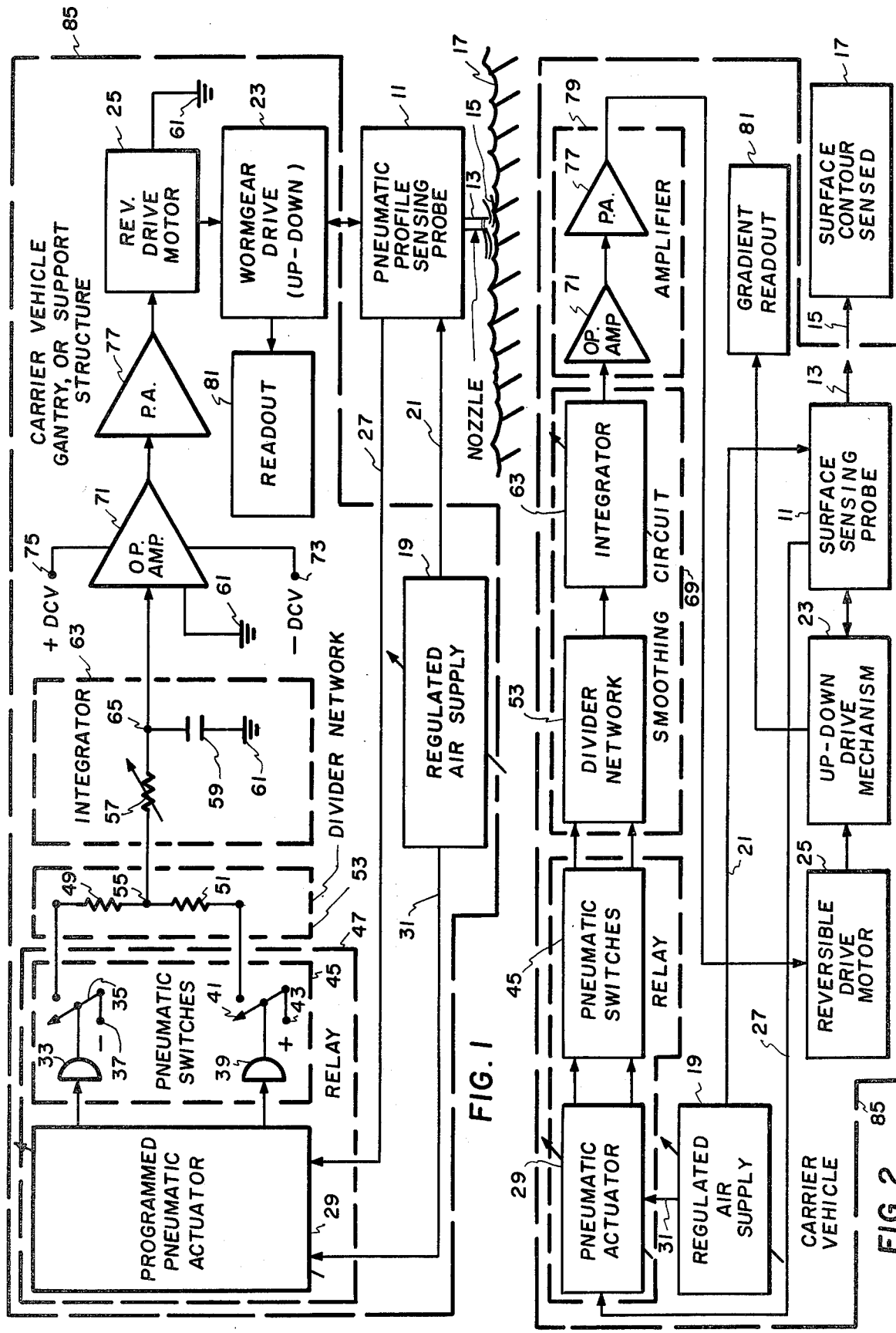

TERRAIN CONTOUR TRACKING SYSTEM

FIELD OF THE INVENTION

The present invention, in general, relates to negative feedback control systems and, in particular, pertains to an improved method and means for simultaneously sensing the contours of a non-uniform surface and indicating the gradients thereof relative to a predetermined datum. In even greater particularity, the subject invention comprises a unique system for accurately and continuously maintaining a pneumatic probe at a substantially predetermined contiguous distance from the non-uniform surface of the earth's terrain or a modelboard representing an actual earth terrain, and for simultaneously indicating the position thereof with respect to a predetermined datum, reference, location, support structure, or carrier vehicle, as desired.

DESCRIPTION OF THE PRIOR ART

Heretofore, surface roughness measurements—be they of the earth, a model, or other—have been made in numerous ways, including by sight, by feel, and by surveying methods. Also, various and sundry gages have been used for such purpose, some of which are quite sophisticated in structure and performance.

Insofar as it is known, the prior art coming the closest to the instant invention appears to be the following:

First, and perhaps best, is the device disclosed in patent application Ser. No. 920,429, filed in the U.S. Patent Office on June 29, 1978, entitled Surface Profile Follower and Indicator System, Navy Case No. 62,039, by inventors John C. McKechnie (the inventor in the instant case) and Paul D. Grimmer. The system disclosed therein is constructed in such manner as to run a pneumatic probe up or down, so as to hunt about a preset distance from a non-uniform surface, with said preset distance being represented by an analogous preset back pressure within said pneumatic probe. A drive motor, running at some predetermined speed, drives a left gear in the opposite direction to that of a right gear by means of an intermediate idler gear. Said left gear has a shaft connected thereto which drives an up-shift clutch, and said right gear has a shaft connected thereto which drives a downshift clutch in the opposite direction as a result of the aforesaid intermediate idler gear being disposed therebetween. When, for example, said up-shift clutch is engaged, a shaft connected thereto is attached to another gear that drives a central gear and lead screw; and when said down-shift clutch is engaged, a shaft connected thereto drives said central gear and the lead screw connected thereto in the opposite direction, thereby causing a platform effectively connected thereto by means of screw threads to move upward and downward, respectively.

A pneumatic probe connected to said up and down moving platform builds up internal air pressure, causing a conventional but sophisticated pneumatic relay to send a pressure signal to a pneumatic switch actuator, so as to cause an up-clutch single-pole-double-throw switch to be actuated. Before actuation thereof, however, a voltage was supplied across an electromagnetic brake, causing the shaft extremity of the aforesaid lead screw to be locked. After said switch is actuated by the aforesaid switch actuator, a voltage is supplied to said up-clutch, causing the drive gear connected thereto and the lead screw gear to effect the rotation of said lead screw in such manner as to cause said platform and pneumatic probe to move away from whatever surface that is being probed thereby. Once the pneumatic probe has moved away from said surface, the pressure therein drops and reverses the aforesaid actuator up-clutch switch, thereby releasing said up-clutch and locking the aforesaid brake. Conversely, when the pneumatic probe is too far away from said surface, the air pressure therein drops, causing a pressure signal from the pneumatic relay to operate a down-switch actuator which, in turn, actuates another single-pole-double-throw switch, so as to cause the aforesaid brake to be deactivated and a down-clutch to be engaged. In such case, the drive motor drives the right gear train in opposite direction to the aforementioned idler gear, and such driving causes said lead screw to drive the aforesaid platform in the downward direction. Reverse diodes are mounted electrically across each of the electromagnetic coils of the up-clutch, the brake, and the down-clutch, respectively, so that each of the electromagnets thereof will release much faster. An up-limit switch is connected in series with the up-clutch, so that it will disengage before reaching some predetermined mechanical limit; conversely, a down-limit switch is connected in series with the aforesaid down-clutch, so that it will likewise disengage before reaching some predetermined mechanical limit.

At any given instant, the position of the aforesaid platform is sensed by another gear continuously enmeshed with the drive gear of said down-shift clutch which, in turn, is effectively connected to a potentiometer and readout that is calibrated in terms of platform position relative to some predetermined datum.

From the foregoing, it may readily be seen that said up-down platform and the pneumatic probe connected thereto will hunt in a sensitive manner about the aforesaid datum which, of course, has been selected by the artisan to be some predetermined distance from the surface whose contours are being measured.

SUMMARY OF THE INVENTION

The present invention overcomes many of the disadvantages of the aforesaid prior art in that, by means of a somewhat simpler system, it automatically measures various and sundry surface gradients with considerably less drag on the surface probe or sensor caused by the friction of the particular surface involved, inasmuch as there is no actual contact therebetween. Hence, the contour measuring accuracy thereof is optimized for many practical purposes.

As previously suggested, the subject system is constructed in such manner as to run a pneumatic probe up or down, so as to hunt about a preset distance from a non-uniform surface, with said preset distance being represented by an analogous preset back pressure within said pneumatic probe. In this particular case, said probe has a constant pressure pneumatic input, a pneumatic nozzle air output directed toward the surface whose gradients are being measured, and a pneumatic control output, the latter of which is connected to a conventional commercially available programmed pneumatic relay device which, in combination with the aforesaid probe, in turn, enables a negative feedback subsystem for effectively maintaining the aforesaid probe and its nozzle a preset distance from said surface.

Therefore, an object of this invention is to provide an improved terrain contour tracking device.

Another object of this invention is to provide an improved method and means for measuring and indicating the gradients of any predetermined surface, including the earth's surface or that of a modelboard which simulates some actual earth terrain surface.

A further object of this invention is to provide an improved method and means for maintaining a pneumatic sensor or probe at substantially a predetermined contiguous distance from a nonuniform surface.

Still another object of this invention is to provide an improved contour surface follower that has little or no drag with respect thereto, as it is moved therealong.

Another object of this invention is to provide an improved surface gradient measuring instrument that does not come in direct physical contact with the surface whose gradient is being measured.

Other objects, advantages and novel features of the invention will become apparent from the following detailed description of the invention when consiered in conjunction with the accompanying drawing wherein:

BRIEF DESCRIPTION OF THE DRAWING

FIG. 1 is a combination schematic and block diagram of the terrain contour tracking device constituting this invention; and FIG. 2 is a generalized block diagram of another species of the subject invention.

DESCRIPTION OF THE PREFERRED EMBODIMENTS

Referring now to FIGS. 1 and 2, wherein there is shown a somewhat specific disclosure and a more generalized disclosure of the subject invention, respectively. It is suggested that, to begin with, reference is made to those areas thereof which are located at or near the lower right hand portions thereof, since so doing will ostensively facilitate having a better understanding of the structure thereof.

A conventional pneumatic profile sensing probe 11 having an air nozzle 13 blows air 15 toward the terrain, modelboard, or other surface 17, the gradients of which are to be measured. A regulated air supply 19 is connected by means of a flexible hose 21 to one of the inputs of said pneumatic profile sensing probe 11 in order to supply air at a predetermined pressure thereto. An up-down worm gear drive 23 is mechanically connected to probe 11 in such manner that both it and nozzle 13 connected thereto are moved toward and away from surface 17 as a result of being driven in one direction or the other by a reversible motor 25.

The pneumatic output of probe 11 is connected by means of a flexible pipe or hose 27 to one of the inputs of a programmed pneumatic actuator 29, the other input of which is likewise connected to the aforesaid regulated air supply 19 by means of a flexible pipe or hose 31.

The aforesaid pneumatic actuator 29 is, of course, a conventional type which is commercially available from a number of different sources. However, it has been found that the pneumatic actuator named Fluidic Gaging Controller, Model FGP-203, manufactured by the Johnson Service Company of Milwaukee, Wisconsin, performs quite satisfactorily thereas. Thus, suffice to say at this time, that Johnson pneumatic relay or actuator FGP-203 accepts pneumatic analog input signals in the range of from three to fifteen pounds per square inch gauge, which it compares with a pair of preset reference air pressures and then effectively determines whether the pressure thereof is above, below, or between said two preset reference air pressures. As a result, air under pressure is produced at either one of the two outputs thereof, thereby respectively representing a too high or too low input air pressure condition; or, in the alternative, it produces no air at either of the outputs thereof, thereby representing a condition wherein the input air pressure falls within the pressure range between the aforesaid preset reference air pressures. Obviously, the proper setting of said preset reference air pressures by the artisan would depend upon whatever range of air pressures as would optimize the operation of the subject invention during any given circumstances, after taking into consideration the type of surface whose gradients were being measured and the dimension of the contour anomalies contained therein. Hence, as will be mentioned again subsequently, pneumatic actuator 29 may be adjusted in such manner as to make pneumatic profile sensing probe 11 hunt about a predetermined distance from surface 17 being sensed thereby—be it the earth's surface, the surface of a modelboard, or any other surface—in a highly accurate and sensitive fashion, or it may be set to allow some predetermined play to occur with respect thereto. Obviously, so doing would merely involve the design choice of the artisan and/or the operator of the subject invention.

One of the pneumatic outputs of pneumatic actuator 29 is connected to the input of a pneumatic actuator 33, the output of which is mechanically connected to the movable arm of a normally open switch 35, the latter of which is connected to a predetermined negative direct current voltage 37. The other pneumatic output of pneumatic actuator 29 is connected to the input of another pneumatic actuator 39, the output of which is mechanically connected to the movable arm of another normally open switch 41, the latter of which is connected to a predetermined positive direct current voltage 43.

As may readily be seen, the aforesaid normally open switches 35 and 41 and their respective pneumatic actuators 33 and 39 constitute a pair of pneumatic switches 45, and, of course, when said pneumatic switches 45 are combined with the aforesaid programmed pneumatic actuator 29, the result is a pneumatic relay 47.

The normally open contacts of switches 35 and 41 are respectively connected to one of the terminals of each of a pair of resistances 49 and 51, the other terminals of which are connected in such manner as to form a common junction of a voltage divider network 53. The interconnected terminals of resistances 49 and 51 constitute a center tap 55 which is connected to one of the terminals of a variable resistance 57, the other terminal of which is connected to one of the plates of a capacitance 59, with the other plate of said capacitance 59 connected to a ground 61. Of course, as combined herein, the aforesaid resistance 57, capacitance 59, and ground 61, effect an integrator 63, with the output thereof taken from the common junction 65 of variable resistance 57 and capacitance 59.

When combined as shown in both FIGS. 1 and 2, the aforementioned divider network 53 and integrator 63 constitute a smoothing circuit 69.

The output junction 65 of integrator 63 is connected to the data input of an operational amplifier 71, with the remaining inputs thereof connected to the aforesaid ground 61, a negative direct current voltage 73, and a positive direct current voltage 75. Although any suitable operational amplifier may be used as operational amplifier 71, it has been found that operational amplifier Model 741, manufactured by the Fairchild Corporation of Mountain View, California, will work quite satisfactorily thereas. The output of operational amplifier 71 is connected to the input of a suitable power amplifier 77, so as to effect a total amplifier 79, as best seen in FIG. 2. The output of power 77, and hence the output of amplifier 79, is connected to the input of the aforesaid reversible drive motor 25, the electrical output of which is connected to said ground 61 for the purpose of completing the electrical circuit thereof, thereby, likewise, completing the negative feedback subsystem of the subject invention.

Because the position of worm drive gear 23 at any particular instant is indicative of the distance probe 11 and nozzle 13 are located from surface 17, an appropriate analog pickoff is taken therefrom which is connected to the input of any suitable readout 81, which is preferably calibrated in terms of distances from a reference datum which, in turn, is an imaginary distance from surface 17 that has effectively been set by the manual adjustment of the aforementioned pneumatic actuator 29. Therefore, readout 81 effectively becomes a continuous indicator and/or recorder of the relative gradients of surface 17 with respect to said imaginary reference datum while the subject invention is traversing said surface 17.

At this time, it would perhaps be noteworthy that the subject invention is intended to be moved over the surface contours being sensed by probe 11, and that any number of tractor means for implementing such movement may be used in combination therewith for such purpose. Nevertheless, for the purpose of this disclosure, a carrier vehicle 85 will be considered as such tractor vehicle, although any other support structure of any suitable type, such as a gantry or the like, may be substituted therefor.

Mode of Operation

The operation of the invention will now be discussed briefly in conjunction with both figures of the drawing.

Again, for purposes of emphasis, the subject invention has been disclosed as being a comparatively specific embodiment and a relatively generalized embodiment, both of which may be considered as being two species of the same invention, with the latter permitting the artisan to have more design latitude than the former.

As carrier vehicle 85 (or any other movable or fixed support structure of any suitable type, such as a gantry or platform or the like) moves the subject invention across the surface to be measured—say, surface 17—or permits said surface to be moved relative thereto, pneumatic probe 11 having air nozzle 13 blows air 15 toward it from some preset distance therefrom. At the same time, regulated air pressure source 19 supplies said air at a predetermined pressure to probe 11. Also, up - down worm gear drive mechanism 23 connected thereto drives probe 11 up or down, so as to position it further away from or closer to said surface 17, as a result of being driven one direction or the other, respectively, by reversible drive motor 25.

As probe 11 is moved toward or away from surface 17, the air pressure within nozzle 13 varies and increases and decreases accordingly; and then, said varying air pressure is transmitted by means of flexible pneumatic hose 27 to conventional programmed pneumatic actuator 29 of conventional pneumatic relay 47.

Although, as previously mentioned, programmed pneumatic actuator 29 is conventional and commercially available, the explanation of its operation will now be further elaborated upon in order to facilitate the understanding thereof, inasmuch as it constitutes one of the key components of the invention. Thus, for example, actuator 29 accepts pneumatic analog input signals within the range of from three to fifteen pounds per square inch gauge. It compares said analog air input signal to two preset reference air pressures and determines whether said analog air input signal is above, below, or between said two reference air pressures. The output signals therefrom consist of "on" or "off" signals of fluidic level; therefore, by analogy, it may be considered as being the pneumatic equivalent of a single-throw-double-pole electrical switch. Accordingly, in this particular case, if the analog input pneumatic control signal supplied thereto exceeds a certain first preset pressure, a larger, definite-pressure, pneumatic signal is produced at one of the outputs thereof, and no pneumatic signal is produced at the other output thereof; and in the event said analog pneumatic input control signal supplied thereto is less than a certain second preset pressure, a larger, definite-pressure, pneumatic signal is produced at the aforesaid other output thereof, and no pneumatic signal is produced at said one output thereof. But, in the event said input analog pneumatic control signal supplied to actuator 29 has a pressure that falls between the aforesaid first and second preset pressures—regardless of preprogrammed range thereof—no pneumatic signal is produced at either of the outputs thereof. Preferably, the aforementioned larger, definite-pressure, pneumatic signals are substantially constant in maximum pressure and, thus, essentially "on" or "off" in action regardless of the pressure of the aforesaid input analog pneumatic control signal. If so desired, the former may be made proportional to the latter, in the event so doing would optimize the operation of relay 47 or that of the entire invention.

The pneumatic outputs from actuator 29 respectively actuate either or neither of diaphragm switch actuators 33 or 39; and they, in turn, when actuated, close normally open electrical switches 35 and 43, respectively. Of course, programmed pneumatic actuator 29, diaphragm actuators 33 and 39, and switches 35 and 41 combine to form pneumatic relay 47.

Because negative direct current voltage 37 is connected to switch 35 and positive direct current voltage 43 of like value is connected to switch 41, a negative voltage is supplied to terminal 49 when switch 35 is closed, and a positive voltage is supplied to terminal 51 when switch 41 is closed. Thus, the polarity of junction 55 changes with the change in the closures of said switches relative to ground 61. In either case, the voltage of center tap junction 55 is supplied to adjustable integrator 63, which acts like a low-pass filter, thereby smoothing it before being supplied to operational amplifier 71. Upon receipt of said voltage—regardless of polarity—operational amplifier 71 produces an electrical output signal that is further amplified by power amplifier 77 before being supplied to reversible drive motor 25 for the energization thereof. Of course, motor 25 runs in one direction if switch 35 is closed and the other direction if switch 41 is closed, and it does not run at all if neither switch 35 nor switch 41 is closed.

If surface sensing probe 11 is physically located at the preset distance from surface 17, motor 25 does not run and, therefore, worm gear drive 23 does not move probe 11 either up or down. But if probe 11 becomes too close to surface 17 due to the changing of the contour thereof, the air pressure in probe 11 increases in inverse proportion with the distance between the end of nozzle 13 and said surface contour, and, therefore, the analog control air pressure out of probe 11 increases, too. Such increase in control air pressure is supplied via flexible hose 27 to programmed pneumatic actuator 29 which, in turn, causes one of switches 35 or 41 to be closed—say, for the purpose of this discussion, switch 35. Closure of switch 35 causes the proper polarity of voltage to motor 35 relative to ground to make it run in whatever direction will raise probe 11 away from surface 17. Of course, the opposite effect occurs if probe 11 gets too far from its preset distance above surface 17.

In view of the foregoing, it may readily be seen that the subject invention incorporates a unique combination pneumatic-electrical-mechanical closed negative feedback system which keeps the pressure in flexible pipe 27 substantially constant—or within the preset pressure range limits of programmed pneumatic actuator 29—as a result of hunting about some preset pressure or within some preset range of pressures, as the case may be. And, consequently, probe 11 effectively tracks the profile of surface 17, regardless of what it may be. But because nozzle 13 never physically touches surface 17, it and probe 11 are relatively friction-free followers of whatever anomalies as exist on surface 17, as they are moved thereacross by carrier vehicle 85 or the like.

The position of worm gear 23 is constantly proportional to the position of probe 11 as it follows a substantially constant distance from surface 17; hence, the positions of gear 23 may be picked-off and read out as, say, the various elevations of surface 17 with respect to the aforementioned programmed reference hypothetical datum, the latter of which may be preset to be very precise or preset to allow, within reason, as much play as desired.

Because of the simplicity and versatility of the above discussed invention, with suitable design changes, the making of which would be well within the purview of the artisan having the benefit of the teachings presented herewith, may be employed to track, measure, and indicate and/or record the profiles of many different types of surfaces, including the earth's, a modelboards's, or the like. Moreover, since the instant contour tracker has a rate action that is effectively nonlinear and increases with deviation from set point, it closely and accurately follows almost any given terrain contour, and with no scraping thereof thereon because of no actual physical (only air) contact therewith. Accordingly, the useful life thereof is increased considerably over surface profile followers that include rollers, contact slides, and the like.

In addition, due to the simplicity of this invention over those of the above mentioned prior art, it ostensively constitutes an advancement in the art.

Obviously, many modifications and variations of the present invention are possible in light of the above teachings. It is, therefore, to be understood that within the scope of the appended claims the invention may be practiced otherwise than as specifically described.

What is claimed is:

1. A terrain contour tracking system, comprising in combination:
    a pneumatic probe adapted for effectively sensing the distance between itself and a surface whose profile is being tracked and measured, said pneumatic probe having a constant pressure pneumatic input, a mechanical input, a pneumatic nozzle output directed toward the aforesaid surface, and a pneumatic control output;
    a pneumatic actuator having a constant air pressure input, a pneumatic control input, and a pair of pneumatic outputs, with the pneumatic input thereof connected to the pneumatic control output of the aforesaid pneumatic probe, with one of the outputs thereof capable of producing air at a predetermined pressure only when the air received at the aforesaid pneumatic control input thereof is less than a first preset pressure, with the other output thereof capable of producing air at a predetermined pressure only when the air received at the aforesaid pneumatic control input thereof is greater than a second preset pressure, and with neither output thereof capable of producing air under pressure when the pressure of the air received at the aforesaid pneumatic control input thereof falls between said first and second preset pressures;
    a pair of pneumatically actuated, normally open switches connected to the outputs of said pneumatic actuator;
    a negative direct current voltage connected to the movable arm of one of said pneumatically actuated, normally open switches;
    a positive direct current voltage connected to the movable arm of the other of said pneumatically actuated, normally open switches;
    a voltage divider network having a pair of input terminals and a center tap output, the input terminals of which are respectively connected to the open contacts of the aforesaid pair of pneumatically actuated, normally open switches;
    an integrator connected to the center tap output of said voltage divider network; and
    means effectively connected between the output of said integrator and the mechanical input of the aforesaid pneumatic probe for moving said pneumatic probe toward and away from the surfae whose profile is being tracked and measured whenever the air supplied to the pneumatic control input of said pneumatic actuator by said pneumatic probe is less than said first preset pressure and greater than said second preset pressure, respectively.

2. The device of claim 1, wherein said surface to be tracked and measured comprises a model board surface.

3. The device of claim 1, wherein said surface to be tracked and measured comprises a predetermined terrain surface.

4. The device of claim 1, wherein said pneumatic actuator comprises a single-throw-double-pole pneumatic relay.

5. The device of claim 1, wherein each of said pair of pneumatically actuated, normally open switches connected to the outputs of said pneumatic actuator comprises:
    a diaphragm actuator; and
    a single-pole-single-throw switch, with the throw thereof connected to the output of its respective diaphragm actuator in such manner as to close said normally open switch upon the pneumatic enabling of its respective diaphragm actuator.

6. The device of claim 1, wherein said voltage divider network comprises:
    a first resistance having a pair of terminals, with one of the terminals thereof connected to the open contact of one of said pair of pneumatically actuated, normally open switches; and a second resistance the resistance of which is substantially identical to said first resistance, said second resistance having a pair of terminals, with one of the terminals thereof connected to the open contact of the other of said pair of pneumatically actuated, normally open switches, and with the other terminal thereof connected to the other terminal of said first resistance, so as to effect a center tap output junction thereat.

7. The device of claim 1, wherein said integrator connected to the center tap output of said voltage divider comprises a lowpass filter.

8. The device of claim 1, wherein said integrator connected to the center tap output of said voltage divider comprises:
 a variable resistor having a pair of terminals, with one of the terminals thereof connected to the center tap output of said voltage divider;
 a ground; and
 a capacitance connected between the other terminal of said variable resistor and said ground.

9. The invention of claim 1, further characterized by means effectively connected to said pneumatic probe moving means for reading out the profile of the surface being tracked and measured in terms of predetermined dimensional units with respect to a predetermined reference datum.

10. The invention of claim 1, further characterized by means effectively connected to said terrain contour tracking system for the moving thereof in such manner as to cause it to traverse a predetermined path located in contiguous disposition with the surface to be tracked and measured.

11. The device of claim 10, wherein said surface tracking and measuring system moving means comprises a carrier vehicle.

12. The device of claim 10, wherein said surface profile tracking and measuring system moving means comprises a gantry.

13. The device of claim 10, wherein said surface profile tracking and measuring system moving means comprises a platform.

14. The device of claim 10, wherein said surface profile tracking and measuring system moving means includes a fixed support structure.

15. A surface profile follower and measuring system, comprising in combination:
 a pneumatic probe adapted for effectively sensing the distance therebetween and a surface whose profile is being followed and measured, said pneumatic probe having a constant pressure pneumatic input, a mechanical input, a pneumatic nozzle output directed toward the aforesaid surface, and a pneumatic control output;
 a pneumatic relay having a constant air pressure input, a pneumatic control input connected to the pneumatic control output of said pneumatic probe, and a pair of electrical outputs, one of which produces a first electrical signal at the output thereof only when the air received at the aforesaid pneumatic control input is less than a first preset pressure, the other of which produces a second electrical signal at the output thereof only when the air received at the aforesaid pneumatic control input is greater than a second preset pressure, and neither of which produces an electrical signal at the outputs thereof when the pressure of the air received at the aforesaid pneumatic control input falls between said first and second preset pressures;
 a smoothing circuit connected to the output of said pneumatic relay;
 means effectively connected between the output of said smoothing circuit and the mechanical input of the aforesaid pneumatic probe for moving said pneumatic probe toward and away from the surface whose profile is being followed and measured whenever the air supplied to the pneumatic control input of said pneumatic relay by said pneumatic probe is less than said first preset pressure and greater than said second preset pressure, respectively;
 a predetermined support structure effectively connected to said surface profile follower and measuring system for effecting the movement thereof across any predetermined surface whose profile is being followed and measured; and
 means effectively connected to the aforesaid pneumatic probe moving means for continuously picking off and continuously reading out an analog signal therefrom in terms of the distance of the aforesaid pneumatic probe from an imaginary reference datum that, in turn, is a predetermined distance from the surface whose profile is being followed and measured.

16. The device of claim 15, wherein said predetermined support structure comprises a controllable carrier vehicle.

17. A surface contour tracking system, comprising in combination:
 a pneumatic probe having a constant pressure air input, a mechanical input, a pneumatic control output, and an air nozzle output;
 a regulated air supply connected to the constant pressure air input of said pneumatic probe;
 a programmed pneumatic actuator having a constant pressure air input connected to the output of said regulated air supply, a control input connected to the pneumatic control output of said pneumatic probe, and a pair of pneumatic outputs;
 a positive direct current voltage source;
 a negative direct current voltage source;
 a first normally open, pneumatically actuable electrical switch having a pneumatic input and a pair of electrical terminals, with the pneumatic input thereof connected to one of the pneumatic outputs of said programmed pneumatic actuator, and with one of the electrical terminals thereof connected to the aforesaid positive direct current voltage source;
 a second normally open, pneumatically actuable electrical switch having a pneumatic input and a pair of electrical terminals, with the pneumatic input thereof connected to the other of the pneumatic outputs of said programmed pneumatic actuator, and with one of the electrical terminals thereof connected to the aforesaid negative direct current voltage source;
 a pair of series connected resistors connected between the other electrical terminals of said first and second normally open, pneumatically actuable electrical switches, with said pair of series connected resistors having a common junction;
 a low-pass filter connected to the common junction of said pair of series connected resistors;

amplifier means connected to the output of said low-pass filter;

a reversible motor connected to the output of said amplifier means; and means connected between the output of said reversible drive motor and the mechanical input of the aforesaid pneumatic probe for effecting the movement thereof toward and away from the surface whose contour is being tracked in inverse proportion with the pneumatic control output pressure from the aforesaid pneumatic probe.

18. The device of claim 17, wherein said low-pass filter comprises:

an adjustable resistance;

a ground; and a capacitance connected between said adjustable resistance and said ground.

19. The device of claim 17, wherein said amplifier means comprises:

an operational amplifier; and a power amplifier connected to the output of said operational amplifier.

20. The device of claim 17, wherein said means connected between the output of said reversible motor and the mechanical input of the aforesaid pneumatic probe for effecting the movement thereof toward and away from the surface whose contour is being tracked in inverse proportion with the pneumatic control output pressure from the aforesaid pneumatic probe comprises a worm and pinion gear drive mechanism.

21. The device of claim 17, further characterized by a regulated air supply connected to the constant pressure air inputs of said pneumatic probe and the aforesaid programmed actuator for supplying air at a predetermined pressure thereto.

22. The invention of claim 17, further characterized by means effectively connected between said surface contour system and the surface whose contour is being tracked for providing relative movement therebetween.

23. The invention of claim 17, further characterized by a readout connected to said pneumatic probe movement effecting means for continuously reading out the movement thereof in terms of the distance thereof from a hypothetical reference datum that, in turn, is a predetermined distance f rom the surface whose contour is being measured.

* * * * *